Nov. 22, 1955

L. L. RERUCHA 2,724,350

MACARONI CUTTING MACHINE

Filed Nov. 13, 1951

INVENTOR
LEO L. RERUCHA

BY Cushman, Darby & Cushman

ATTORNEY

Nov. 22, 1955

L. L. RERUCHA 2,724,350

MACARONI CUTTING MACHINE

Filed Nov. 13, 1951

INVENTOR

LEO L. RERUCHA

BY Cushman, Darby & Cushman

ATTORNEY

Nov. 22, 1955     L. L. RERUCHA     2,724,350
MACARONI CUTTING MACHINE
Filed Nov. 13, 1951     9 Sheets—Sheet 6

FIG 6.

INVENTOR
LEO L. RERUCHA
BY Cushman, Darby & Cushman
ATTORNEY

Nov. 22, 1955 L. L. RERUCHA 2,724,350
MACARONI CUTTING MACHINE
Filed Nov. 13, 1951 9 Sheets-Sheet 7

INVENTOR
LEO L. RERUCHA
BY Cushman, Darby & Cushman
ATTORNEY

# United States Patent Office 2,724,350
Patented Nov. 22, 1955

2,724,350

MACARONI CUTTING MACHINE

Leo L. Rerucha, Lincoln, Nebr., assignor to Cornhusker Machines Co., Lincoln, Nebr., a corporation of Nebraska Application November 13, 1951, Serial No. 255,971

21 Claims. (Cl. 107—22)

This invention pertains to a machine for cutting macaroni, and more particularly to a machine for cutting off the elbow portions from U-shaped pieces of macaroni, trimming the remaining straight pieces, and cutting the latter into shorter lengths. This application is a continuation-in-part of my copending application Serial No. 168,230, filed June 15, 1950, now abandoned.

Macaroni is a dried paste food product made from wheat flour, eggs, and water. These ingredients are mixed to form a paste that is extruded in various shapes which are thereafter dried and subsequently packaged for sale. The particular type of macaroni with which this invention is concerned is in the form of long slender rods which, after extrusion, are draped over a cylindrical drying stick that is suspended from racks during the drying of the macaroni draped thereover.

For merchandising purposes, the resulting U-shaped pieces of macaroni, after drying and hardening, usually have the elbow portions cut therefrom to produce straight sections of macaroni, that frequently are termed spaghetti. The long free sections of macaroni depending from a drying stick usually are not of uniform length because of various rotational movements of the stick before the macaroni draped thereon hardens. Such non-uniformity necessitates trimming the somewhat ragged free ends of the straight sections after removal of the elbow portions in order to provide a product of uniform length. Additionally, it is sometimes desirable for merchandising purposes to cut the long straight sections of macaroni into shorter lengths, particularly for packaging in cans or in other types of smaller, more easily handled packages.

Heretofore, the elbow portions of U-shaped pieces of macaroni have been cut off by removing the pieces from the drying stick and, by hand, advancing bundles of the pieces against a circular saw. This method of cutting off the elbow portions from U-shaped pieces of macaroni is unsatisfactory for several reasons. As an example, in an existing macaroni plant approximately seven workers were needed, prior to this invention, to saw off the elbow portions, thus necessitating rather large expenditures for labor. Additionally, the sawing operation created a great deal of dust which was extremely disagreeable to the workers.

Hence, it is an object of this invention to provide a machine which will sever the elbow portions from U-shaped pieces of macaroni with a minimum of manual labor.

It is another object of this invention to provide a machine of the type described which is rapid and efficient in its operation.

It is another object of this invention to provide a machine of the type described in which the macaroni is fed thereto while draped on a drying stick, thereby greatly reducing the labor required to operate the machine.

It is another object of this invention to provide a machine of the type described in which a drying stick having macaroni draped thereover may be inserted into the machine and the cutting operation thereupon proceed without further attention by the operator, with the stick automatically passing through the machine and being caught in a rack provided for such purpose.

It is another object of this invention to provide a macaroni cutting machine of the type described which not only will cut off the elbow portions from U-shaped pieces of macaroni, but also trim the ragged free ends to provide straight sections of macaroni of substantially uniform length.

It is still another object of this invention to provide a machine of the type described for cutting off the elbow portions from U-shaped pieces of macaroni, trimming the free ends to provide straight sections of uniform length, cutting such sections into shorter lengths, and delivering the resulting product to a station for easy removal for packaging; all of such operations being accomplished in a continuous process.

It is still another object of this invention to provide a machine of the type described in which the drying stick with the macaroni draped thereover is placed in the machine and straight sections of macaroni of a desired length are delivered to a packaging station with no other operations necessary by the operator.

It is still another object of this invention to provide a machine of the type described with optional means for severing the straight sections of the U-shaped pieces of macaroni, with the elbows removed therefrom, into uniform shorter lengths.

It is still another object of this invention to provide a machine of the type described which will minimize breakage or other damage to the pieces of macaroni fed therethrough.

It is a further object of this invention to provide a machine of the type described that is relatively simple in design and consequently inexpensive to manufacture.

Other objects and advantages of this invention will be evident from the following description and accompanying drawings, in which:

Figure 3 is an elevational view of the left-hand portion of the machine shown in Figure 1, and taken from the opposite side of the showing of the latter figure.

Figure 1:
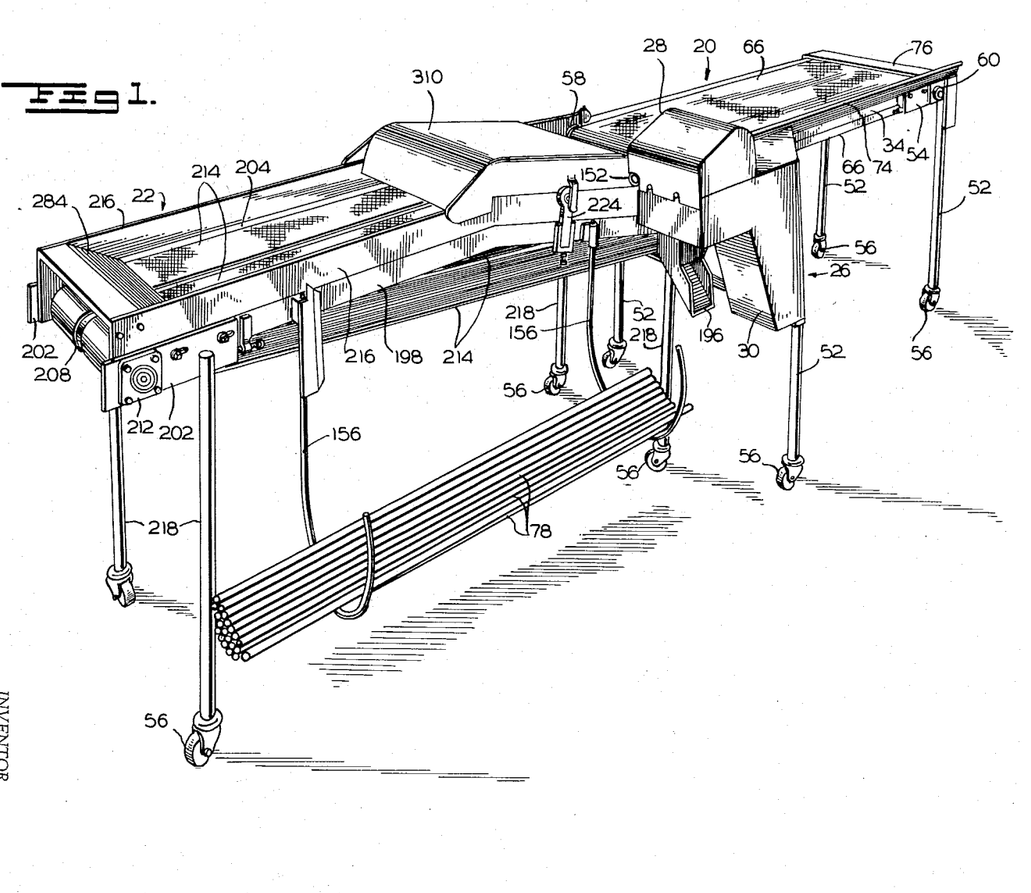
Figure 1 is a perspective view of a macaroni cutting machine embodying this invention.

Referring now to the drawings, a machine embodying this invention comprises two tables 20 and 22 which are aligned end-to-end, as best shown in Figure 1, and detachably secured together for reasons later described. For convenience the table 20 will be termed the cut-off table and the table 22 the trimming table. The cut-off table 20 constitutes the macaroni receiving end of the machine and also supports the driving motor 24 (Figure 2) and the mechanism for cutting off the elbow portions of the macaroni. The trimming table 22 receives the straight sections of macaroni from the cut-off table 20, after the elbow portions have been cut off, and supports the mechanism for trimming the free ends of the straight sections and, optionally, mechanism for cutting the trimmed straight sections into shorter lengths.

At one end of the cut-off table 20 is a laterally projecting portion 26 (Figure 1), which supports the driving mechanism of the machine and the cut-off mechanism. Preferably, this mechanism is enclosed by removable guard covers 28 and 30. The cut-off table 20 has a substantially rectangular frame formed, in part, by a pair of transverse angle bars 32 (Figures 5 and 6), at one end thereof, and side angle rails 34. The transverse angle bars 32 project laterally of one side of the frame, as best shown in Figure 6, and have bolted thereto a shelf 36 which supports the cut-off and associated mechanism. A spacer block 38 (Figure 4) is interposed between the bars 32 and the shelf 36. Depending from opposite ends of the inner bar 32 are frame supporting struts 40 and 42 having a transverse angle member 44 secured to the lower ends thereof. The angle member 44, in conjunction with a hanger member 46 depending from one of the side rails 34, supports a shelf 48 on which the motor 24 and a gear box 50 are mounted.

Figure 4:
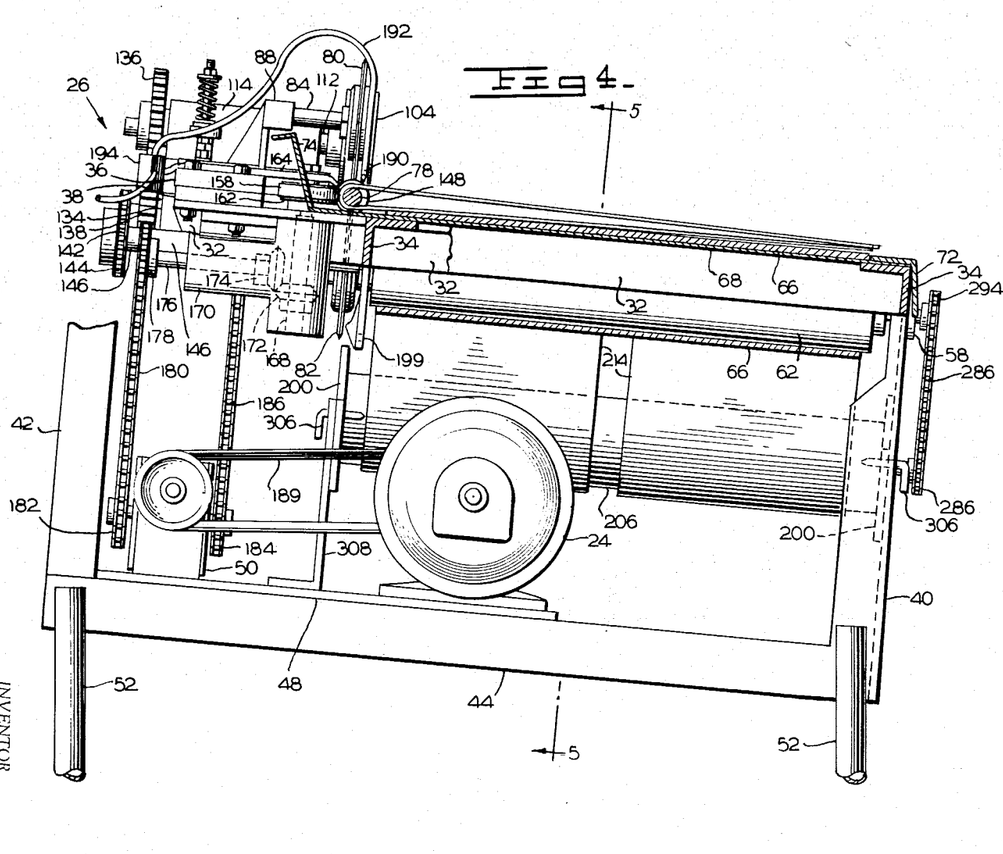
Figure 4 is a sectional view taken on the line 4—4 of Figure 2, with certain of the guard covers removed, and portions broken away, to illustrate the details of the machine.

The table 20 is supported in a laterally inclined position, best shown in Figure 4, by four supporting legs 52, one secured to the lower end of each of the struts 40 and 42, and one secured to each of two side rail extensions 54 (Figure 2) of the frame at the other end of the table. These side rail extensions 54 are secured to the frame for longitudinal adjustment, as by suitable slot and bolt arrangements, for reasons later described. Preferably, the legs 52 are provided with casters 56.

Mounted in pairs of suitable bearings 58 and 60 at each end of the table are rollers 62 and 64, respectively, supporting an endless conveyor belt 66, the upper flight of which rests on a top plate 68 carried by the table frame and forming the upper surface of the cutting table 20. The bearings 60 for the roller 64 are carried by the frame extensions 54 (Figure 2) so that the tension of the belt 66 may be adjusted by longitudinal adjustment of the extensions. One of the bearings 58 is secured beneath the shelf 36 (Figure 6) while the other is carried by an extension 70 (Figure 2) of one of the side rails 34. The table 20 is provided with a protective depending apron 72 along its lower side and with an upstanding wall 74 along the higher side. Preferably, the roller 64 is enclosed in a suitable housing 76.

Figure 5:
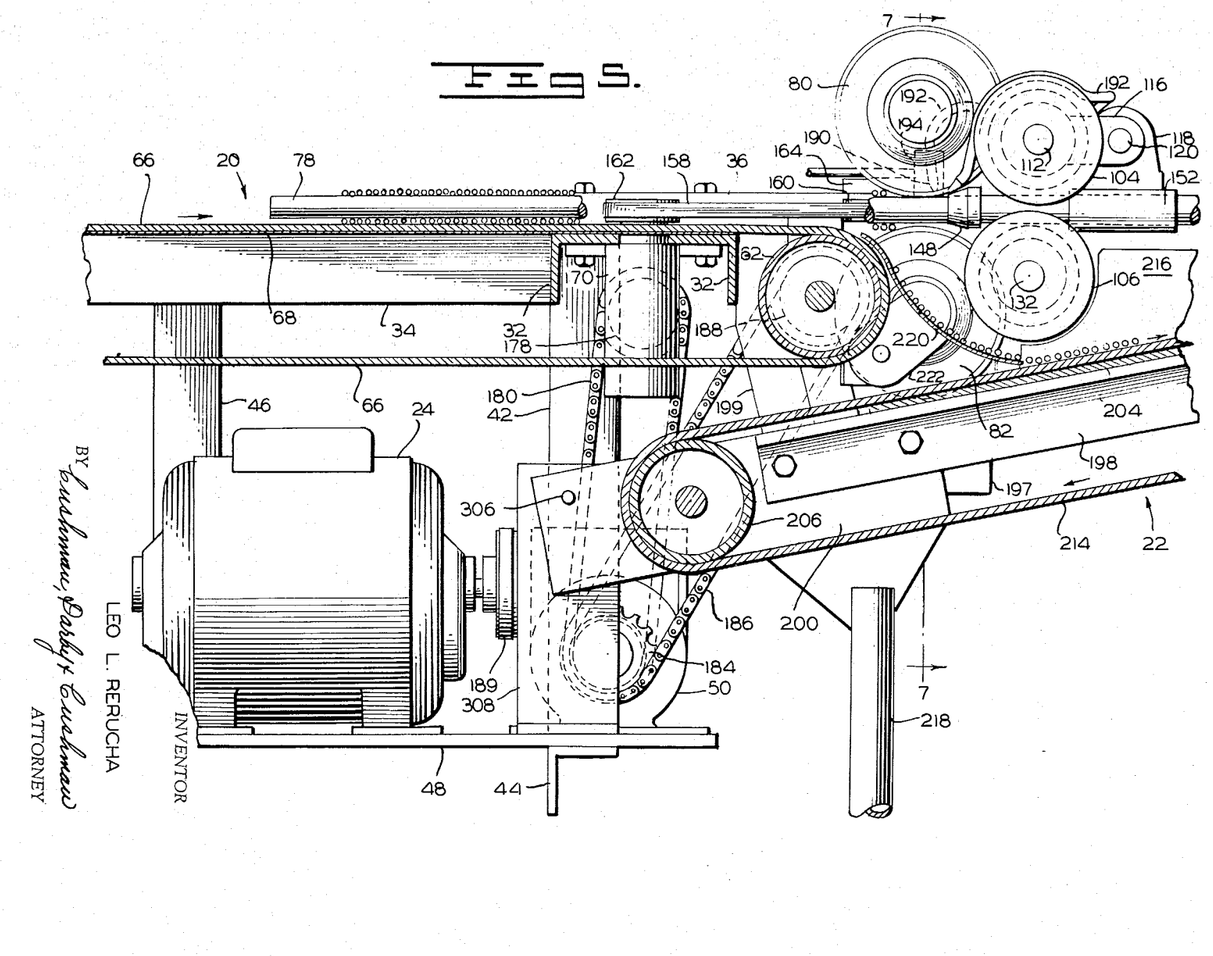
Figure 5 is an enlarged fragmentary sectional view taken substantially on the line 5—5 of Figure 4.
Figure 6:
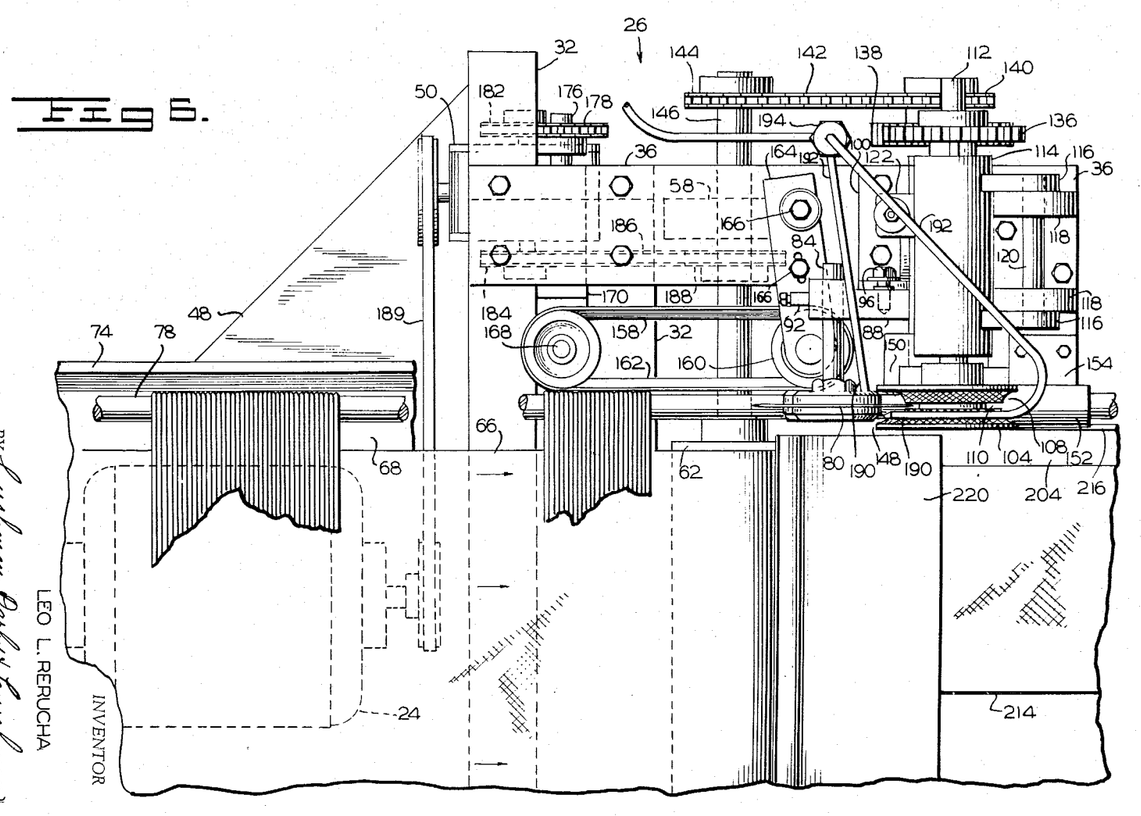
Figure 6 is an enlarged fragmentary plan view of that portion of the machine shown in Figure 5.

A drying stick 78, together with the macaroni draped thereover, is adapted to be removed from a drying rack (not shown) and placed on the belt 66, with the U-shaped pieces of macaroni disposed sideways thereon, and with the stick in alignment with the cutting mechanism subsequently to be described, as shown in Figures 4, 5, and 6. In this position, the stick 78 is positioned against the upstanding wall 74 and it will be noted that one edge of the conveyor belt 66 is spaced from such wall so that the stick overhangs this edge of the belt, as shown in Figures 4 and 6.

Figure 7:
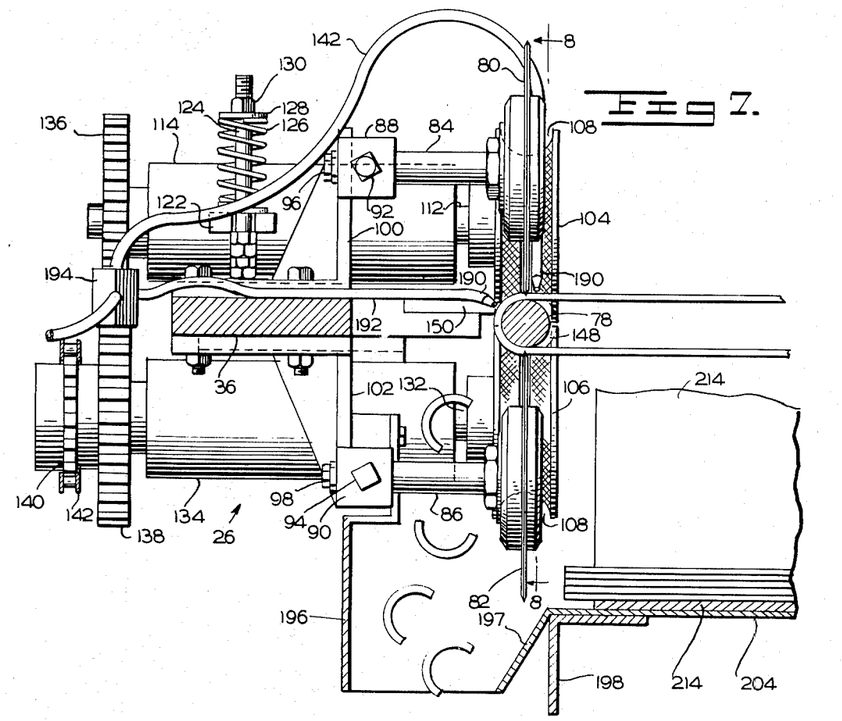
Figure 7 is an enlarged fragmentary sectional view taken substantially on the line 7—7 of Figure 5.

Carried by the shelf 36 in position for alignment of the macaroni stick 78 therewith and just beyond the terminal end of the conveyor belt 66, that is, slightly beyond the roller 62, are a pair of superposed rotatable cutting discs 80 and 82 having knife edges. The edges of the discs 80 and 82 are spaced apart a distance slightly greater than the width of the macaroni stick 78, but a distance less than the diameter of the macaroni stick plus two diameters of the macaroni draped thereover. Hence, it will be seen that as the macaroni stick 78 advances between the cutting discs 80 and 82, as best shown in Figures 4, 5, and 7, the elbow portions of the U-shaped pieces of macaroni will be severed therefrom. The cutting discs 80 and 82 are rotatably secured upon shafts 84 and 86 that project through apertures in bracket arms 88 and 90, respectively, and are secured for axial adjustment therein by set screws 92 and 94. The bracket arms 88 and 90 are pivotally secured, by bolts 96 and 98, on L-shaped brackets 100 and 102 that are bolted to the upper and lower sides of the shelf 36, respectively. It thus will be seen that the supports for both of the discs 80 and 82 may be adjusted for varying the spacing between the knife edges of the latter.

Figure 8:
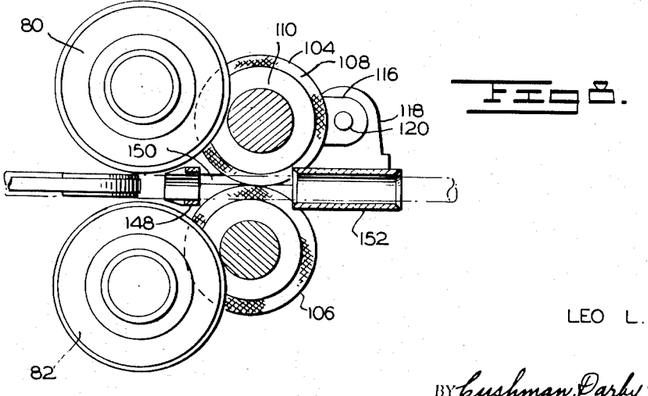
Figure 8 is a sectional view taken on the line 8—8 of Figure 7.

Mounted directly to the rear of the cutting discs 80 and 82 and in alignment therewith are a pair of superposed wheels 104 and 106, each having a circumferential groove 108, arcuate in transverse section and the side walls of which are knurled, as shown best in Figures 6, 7, and 8. Preferably, each wheel 104 and 106 is provided with a narrow relatively deep circumferential groove 110 at the bottom of the groove 108. By means of this construction, the wheels 104 and 106 may be placed into close proximity with the discs 80 and 82 and with the edges of the latter extending into the corresponding grooves 110, as shown in Figure 6. The top wheel 104 is fixed to a shaft 112 which is rotatably mounted in a bearing member 114 having a pair of lateral bosses 116 provided with aligned apertures. A pair of upstanding apertured ears 118 on the shelf 36 have their apertures aligned with those of the lateral bosses 116 and a pivot pin 120 extending therethrough to support the bearing member 114 for pivotal movement about a substantially horizontal axis. The bearing member 114 is also provided with another lateral boss 122 substantially diametrically opposite the bosses 116 and having a slot in the end thereof receiving a rod 124 (Figure 7) extending vertically upwardly from the horizontal portion of the bracket 100. A coil spring 126 is interposed between the boss 122 and a washer 128 held on the end of the rod 124 by a nut 130 threaded thereon. By means of this construction it will be seen that the upper wheel 104 is urged by the spring 126 downwardly toward the lower wheel 106.

The lower wheel 106 is affixed to a shaft 132 which is rotatably mounted in a bearing member 134 (Figure 7) bolted to the underside of the shelf 36. The shafts 110 and 132 project out of the other ends of their respective bearing members 114 and 134 and have meshing gears 136 and 138 secured thereon. Fixed to the outer end of the shaft 132 on the outer side of the gear 138 is a sprocket 140 which is driven by a chain 142 extending over another sprocket 144 mounted on an extension 146 of the shaft of the roller 62. Hence, as the conveyor belt 66 advances, the wheels 104 and 106 will be driven in opposite directions and are spaced to receive and grip the macaroni stick 78 therebetween. The drive ratios for the belt 66 and the wheels 104 and 106 are such that the macaroni stick will be advanced by the wheels at the same linear speed as the conveyor belt supporting the macaroni and will be pulled between the cutting discs 80 and 82, upon being gripped by the wheels, without further attention by the operator.

Positioned between the bite of the discs 80 and 82 and the bite of the wheels 104 and 106 is a tubular front guide 148 for the stick 78. The front guide has a lateral supporting plate 150 which fits into a complementary recessed portion in one side of the shelf 36 and bolted thereto. A rear tubular stick guide 152 is positioned immediately to the rear of the bite of the stick gripping wheels 104 and 106, and also has a lateral supporting plate 154 that is bolted into a recessed portion of the shelf 36 at one side thereof. These front and rear stick guides 148 and 152 serve to guide the stick 78 in its movement between the cutting discs 80 and 82 and between the cutting wheels 104 and 106 and to maintain the stick in an axial path of travel until it has cleared the terminal end of the rear guide 152. In the normal operation of the machine, the stick 78 will continue to advance until it has cleared the wheels 104 and 106, at which time the stick will be supported in a substantially horizontal position by the rear guide 152 and project therefrom alongside of the trimming table 22. The feeding of another stick of macaroni through the machine by an operator will serve to push the thus projecting stick out of the rear stick guide 152 for fall by gravity into racks 156 attached to the side of the table 22, as best shown in Figure 1.

In order to maintain the elbow portions of the macaroni in tight engagement with the stick 78 while the latter is passing between the cutting discs 80 and 82, and also to prevent fracture of these elbow portions prior to their severance by the cutting discs, there is provided alongside the terminal portion of the conveyor belt 66 a narrow endless belt 158 having one flight thereof engaged against the elbow portions of the macaroni. This belt 158 is supported for movement upon two horizontally spaced pulleys 160 and 162 turning about vertical axes. The pulley 160 is rotatably mounted on the underside of a horizontal arm 164 that is in turn adjustably secured on top of the shelf 36 by a pair of bolts 166 passing through enlarged apertures in the arm 164. The pulley 162 is affixed to a shaft 168 that extends within a gear housing 170 bolted to the underside of the shelf 36 and has a bevel gear 172 secured thereon (Figure 4). A second bevel gear 174 meshes with the bevel gear 172 and has its shaft 176 projecting outwardly from the gear housing 170 at substantially right angles to the shaft 168.

The projecting outer end of the shaft 176 has a sprocket 178 mounted thereon for drive by a chain 180 driven from a sprocket 182 on a power takeoff shaft of the gear box 50. A sprocket 184 on an opposite power takeoff shaft of the gear box 50 drives, by a chain 186, a sprocket 188 secured on the supporting shaft of the roller 62 inwardly of the bearing 58. The reduction gearing effected by the gear box is such that the elbow-engaging belt 158 travels in the same direction and at the same linear speed as the conveyor belt 66. Power is supplied to the gear box 50 by a belt 189 engaging suitable pulleys on the shaft of the motor 24 and on the power input shaft of the gear box.

During the severing of the elbow portions by the cutting discs 80 and 82, cuttings usually are formed in the shape of small hard particles of macaroni which tend to cling to the stick 78 as it advances through the front stick guide 148. In order to prevent these hard particles of macaroni from being embedded in the stick 78, which usually is made of relatively soft wood, by passage of the stick and the particles between the wheels 104 and 106, there preferably is provided a pair of air nozzles 190 for directing blasts of air against the stick 78 immediately in advance of, and directed away from, the front stick guide 148. Such blasts of air serve to blow the hard particles of macaroni off the stick before they can be pressed into the soft wood by the stick-pulling wheels 104 and 106. Air is supplied to these nozzles 190 by means of feed tubes 192 extending from a suitable manifold or fitting 194 that is supplied with air under pressure from any appropriate source.

Directly beneath the lower cutting disc 82 is a chute 196, formed in part by a bent-over portion 197 of a side wall 216 of the trimming table 22, for receiving the severed elbow portions and directing them downwardly by gravity into any appropriate receptacle, not shown (see Figures 1 and 7). The chute 196 is supported on a bracket 199 (Figures 4 and 5) depending from the outer angle bar 32 of the frame of the cutting table 20.

As previously stated, the table 20, together with the conveyor belt 66 and the entire cutting and stick-pulling mechanism, is inclined slightly laterally from the horizontal. Such inclination is in a downward direction from the cutting mechanism side of the table 20. By this means the operator of the machine may more conveniently place a stick of macaroni upon the conveyor. Additionally, it has been found in actual practice that the inclination so imparted to the straight sections of the macaroni pieces enables a cleaner cut to be made by the cutting discs 80 and 82 and that such straight sections will tend to fall away more rapidly from such discs without bunching up and tending to bind the cutting action of the freely rotatable discs.

The upper surface of the trimming table 22 has an upwardly inclined portion aligned with a substantially horizontal portion, as best shown in Figures 1 and 3. The upwardly inclined portion of the trimming table 22 has its lower end disposed beneath the terminal end of the cutting table conveyor, as best shown in Figure 5. The trimming table 22 has a substantially rectangular frame formed, in part, by side angle rails 198 having end extensions 200 and 202 at each end thereof. A top plate 204 is mounted on the frame of the trimming table to form a flat upper surface upon which slides the upper flight of an endless belt conveyor mounted upon parallel rollers 206 and 208 supported in bearings 210 and 212 mounted on the side rail extensions 200 and 202, respectively. The endless conveyor has a pair of belts 214 that are spaced laterally from each other and from upstanding side walls 216 on the table 22 for reasons later apparent. Preferably, the extensions 202 are secured to the frame for longitudinal adjustment to adjust the tension of the belts 214. The table 22 is supported, in the same laterally inclined position as the cutting table 20, on four legs 218 secured to the side rail extensions 200 and 202 and provided with casters 56.

From this construction it will be seen, as best shown in Figure 5, that the roller 206 is positioned below and slightly in advance of the terminal roller 62 of the conveyor on the cutting table and that the upper flight of the trimming table conveyor advances upwardly in a direction to receive, by gravity, from the cutting table conveyor the straight sections of macaroni after the elbow portions have been cut off. Preferably, an inclined curved plate 220 receives, by gravity, the straight sections of macaroni upon severance of the elbow portions and allows them to slide, by gravity, downwardly for pick-up by the belts 214 of the lower conveyor. This inclined plate 220, which may be secured in place by angular end portions 222 (Figure 2) suitably fastened to the side rail extension 70 on the cutting table 20, serves as a gravity chute to lower the macaroni gradually to the lower conveyor without breakage. One of the upstanding side walls 216 of the trimming table is substantially aligned with the plane of the cutting discs 80 and 82, so that as the straight sections of macaroni are deposited on the trimming conveyor, the severed ends of the macaroni abut against such wall 216 to maintain them in substantial alignment while their other uneven ends overhang the outer edge of the belt 214 on the opposite side of the conveyor.

Figure 9:
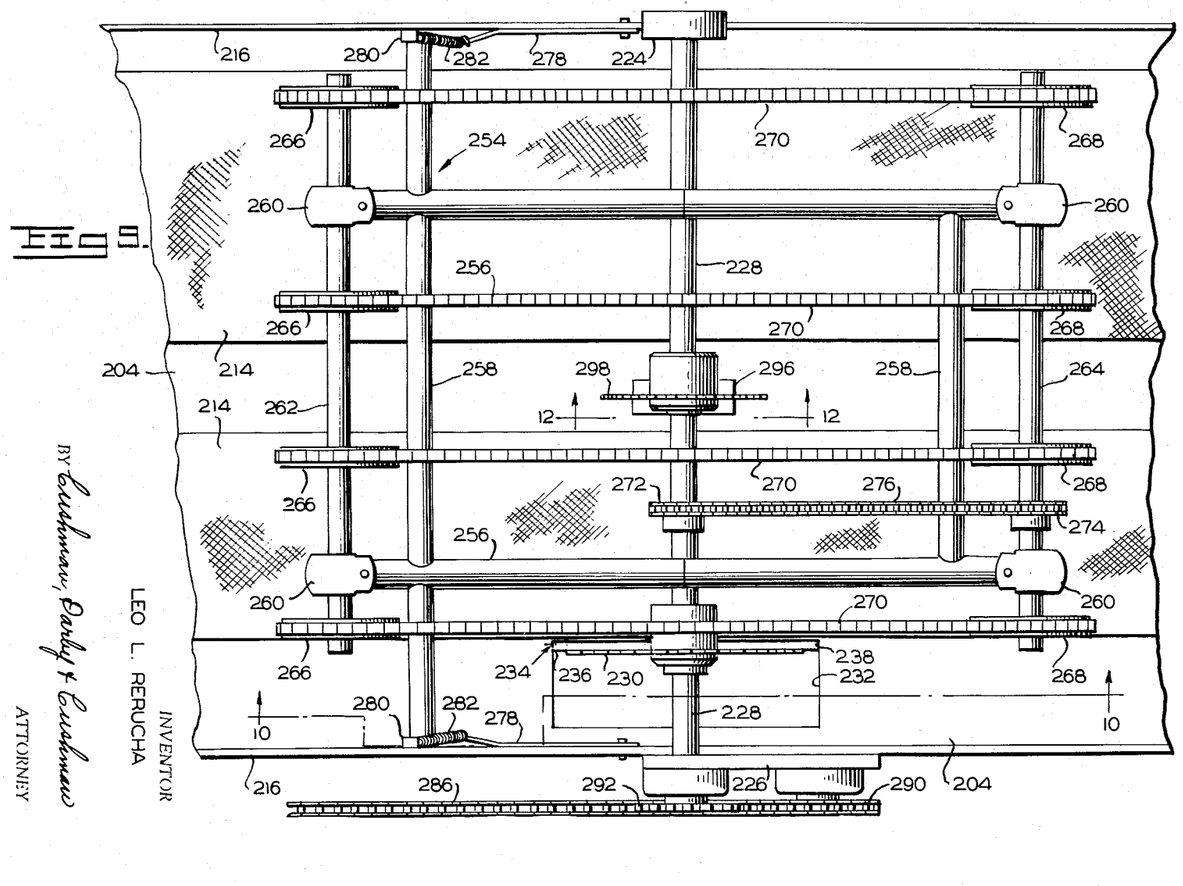
Figure 9 is an enlarged fragmentary plan view of the trimming mechanism of the machine with the guard cover removed therefrom.
Figures 10, 11:
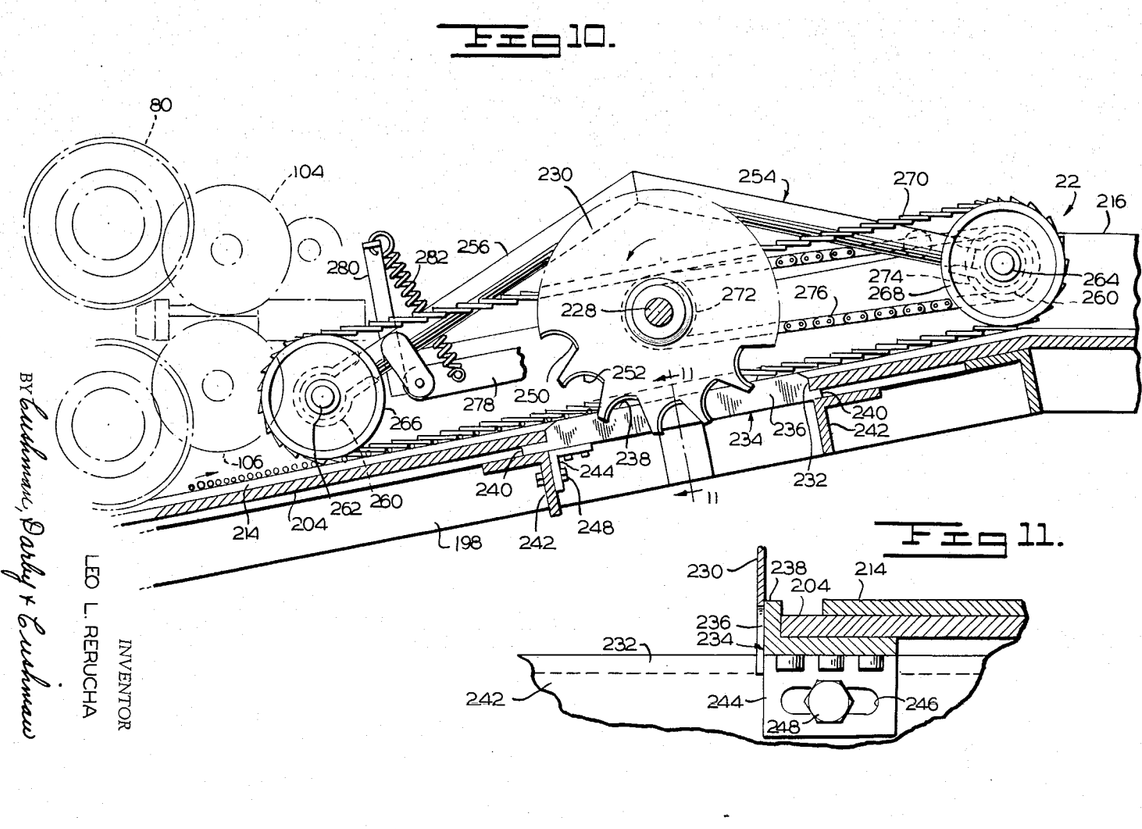
Figure 10 is a fragmentary sectional view taken on the line 10—10 of Figure 9.
Figure 11 is an enlarged fragmentary sectional view taken on the line 11—11 of Figure 10.

Journalled in bearings, carried by vertically adjustable bearing supports 224 and 226 mounted on each side of the frame of the trimming table, is a transverse shaft 228 spaced above and parallel to the upper surface of the upwardly inclined portion of the table 22. The shaft 228 has affixed thereto a rotating cutting disc 230 spaced slightly laterally from the outer edge of the conveyor belt 214 (Figures 9 and 10). A substantially rectangular opening 232 is formed in the top plate 204 of the table 20 and set into such opening, adjacent the edge of the belt 214, is an anvil 234 having a vertically disposed plane surface 236 and a flat, rather narrow upper surface 238. The anvil 234 has end tongues 240 that rest on transverse angle bars 242 beneath the top plate 204 and is held in place by an L-bracket 244 having a slot 246 and bolt 248 (Figure 11) connection to one of the bars 242. Hence, the anvil may be adjusted longitudinally of the shaft 228. The upper surface 238 of the anvil 234 is disposed in substantially the same plane as the upper surface of the belts 214, while the vertical surface 236 of the anvil is overlapped by the cutting disc 230. This disc 230 is provided with a plurality of peripheral notches 250, each having an arcuate sharp edge portion 252 facing in the direction of rotation of the disc. As the macaroni travels upwardly on the belts 214 along the inclined surface of the table 22, several pieces of macaroni are engaged at one time within one of the notches 250 of the cutting disc 230 and the uneven ends thereof trimmed by the action of the sharp edge portion 252. The cuttings resulting from this operation fall through the opening 232 for collection in any suitable receptacle (not shown).

In order to cause the straight sections of macaroni to advance up the inclined surface of the trimming table 22 without sliding back and also to hold such sections firmly against the belts 214 while they are trimmed by the cutting disc 230, there is provided a floating frame 254 formed by arched longitudinal tubular members 256 and transverse tubular members 258. Bearings 260 on the ends of the longitudinal members 256 carry a pair of spaced parallel transverse shafts 262 and 264 having a suitable number (four are shown in Figure 9) of aligned pairs of pulleys 266 and 268 mounted thereon. Each pair of pulleys 266 and 268 carries an endless belt 270 of the overlappingly-connected-block type. The frame 254 is floatingly mounted, by means later described, so that the belts 270 rest in overlying engagement with the straight sections of macaroni supported on the belts 214, as shown in Figure 10. A pair of aligned sprockets 272 and 274, mounted on the cutter shaft 228 and on the frame shaft 264, respectively, have a chain 276 engaged therewith for driving the frame shaft 264 to effect movement of the belts 270 at substantially the same linear speed as the speed of the conveyor belts 214, as later described.

The leading transverse member 258 of the frame 254 is extended to within close proximity of the upstanding side walls 216 of the table 22 and are connected to such walls by links 278 pivotally connected about a horizontal axis to the ends of the member 258 and to the walls 216. Mounted on each side wall 216 adjacent a corresponding extended end of the leading transverse frame member 258 is an upstanding bracket 280 having a coil tension spring 282 supported from the upper end thereof and with the lower end of such spring connected to the corresponding link 278, adjacent the point of pivotal connection of the latter with the member 258.

From this construction it will be seen that the frame 254, together with the macaroni-engaging belts 270, is resiliently supported on the macaroni, so that the weight of the frame and belts will effectively hold the macaroni firmly against the conveyor belts 214 during advance up the inclined surface of the table 22 and past the end-trimming cutting disc 230. The particular overlapping-block construction of the belts 270 also provides pockets to retain the macaroni and forcefully advance the same without backsliding.

The trimming table 22, at the terminal end of its conveyor, is provided with an upwardly and outwardly sloping wall 284 (Figure 1) which depends into close proximity with the upper surface of the moving conveyor belts 214 to thereby stop and accumulate the trimmed macaroni for removal by an operator for subsequent packaging.

The transverse cutter shaft 228, together with the belts 270, and the trimming table conveyor, are driven by an endless chain 286, normally enclosed in a guard housing (not shown), as best shown in Figure 3. This chain 286 passes over a sprocket 288 on the end of the shaft of the roller 206, over an idler sprocket 290 adjustably mounted on the bearing support 226, under a sprocket 292 secured on the end of the transverse shaft 228, and over a sprocket 294 on the end of the shaft of the terminal roller 62 of the cutting table conveyor. By this means it will be seen that power for the trimming table 22 is provided from the cutting table 20 and that, by suitable adjustment of the idler sprocket 290, tension on the chain 286 may be relieved sufficiently to permit its being disengaged from the sprocket 294 on the roller 62.

Figures 11, 12, 13:
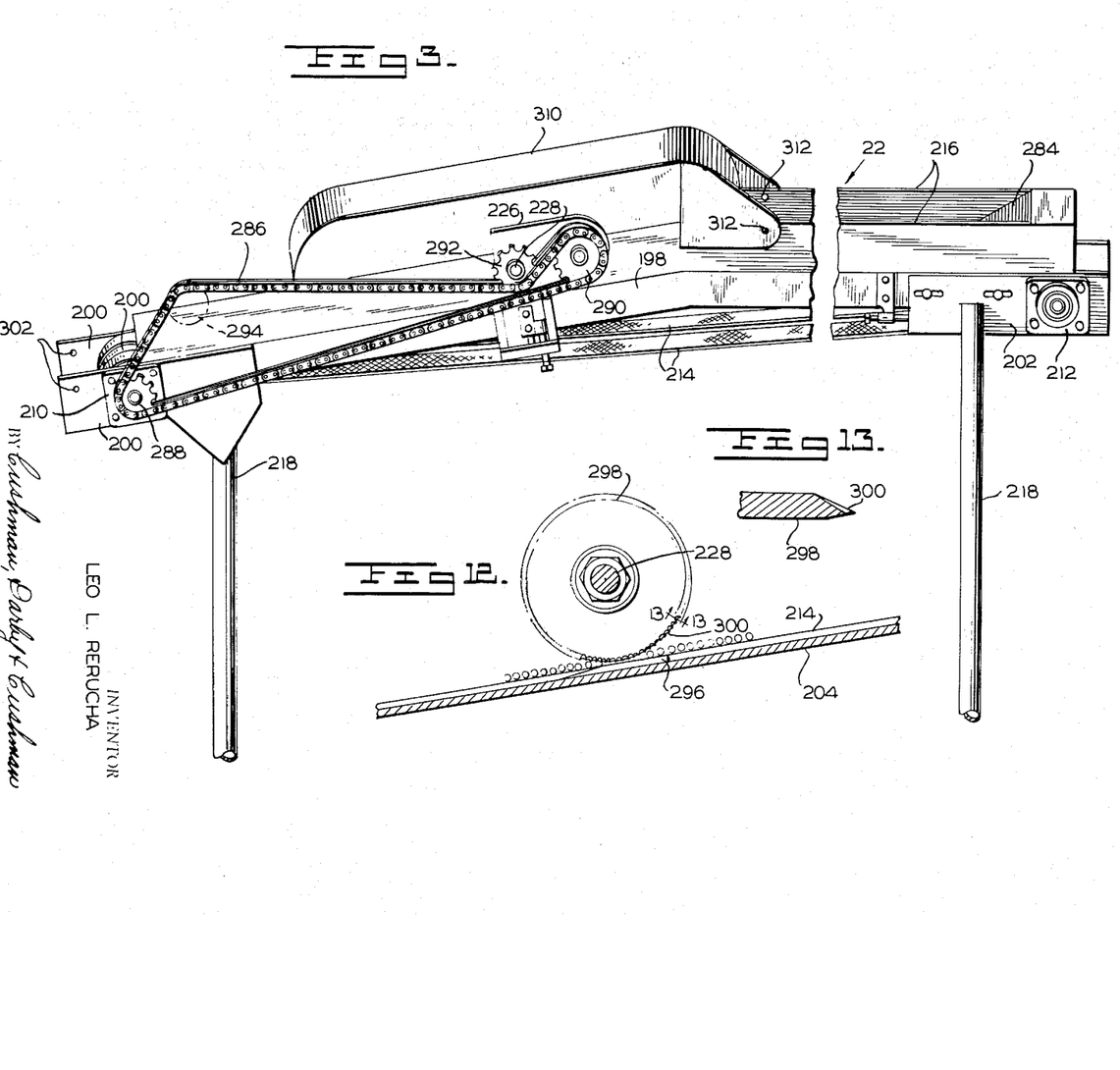
Figure 12 is a fragmentary sectional view taken on the line 12—12 of Figure 9.
Figure 13 is an enlarged fragmentary sectional view taken on the line 13—13 of Figure 12.

Mounted on the top plate 204 of the trimming table 22 in the space between the two conveyor belts 214 and immediately below the transverse shaft 228 is a plate-like anvil 296 having the upper surface thereof substantially flush with the upper surface of the conveyor belts 214, as shown best in Figures 9 and 12. Fixed to the transverse shaft 228 above the anvil 296 is a circular saw 298 having relatively fine bevelled teeth 300 thereon, as best shown in Figure 13. The cutting edge of the saw 298 depends into close proximity with the upper surface of the anvil 298 so that the straight sections of macaroni advancing on the conveyor belts 214 will be severed into two substantially equal lengths at the same time that their uneven ends are trimmed by the cutting disc 230.

It will be seen that this severing means may take the form of a plurality of circular saws 298 spaced along the transverse shaft 228 with corresponding anvils 298 on the top plate 204 of the trimming table 22 in order to cut the straight sections of macaroni into any number of shorter lengths. Obviously, the number of laterally spaced conveyor belts 214 must be varied in accordance with the number of circular saws employed, in order to provide an open space between such belts for the positioning of a plate-like anvil for each saw. Likewise, if it is desired that the straight sections of macaroni be delivered to the terminal end of the conveyor in intact long lengths, that is, having only their ends trimmed, the circular saw 298 will be omitted from the trimming table.

In actual operation it has been found to be more convenient and expedient to provide a number of trimming tables 22 each having, for use in conjunction with the cutting table 20, a different number of circular saws 298, or a complete omission of such saws. In order to provide for ready substitution of these various trimming tables, it will be noted that each side rail extension 200 on the lower end of the trimming table 22 is provided with a hole 302 therethrough which is alignable with a corresponding hole 304 in the frame structure of the cutting table 20, so that securing pins 306 (Figure 4) may be passed therethrough to detachably secure the trimming table 22 in operative position to the cutting table 20. As best shown in Figures 4 and 5, one of the holes 304 in the frame structure of the cutting table 20 is provided in the upper end of an upstanding bracket 308 on the motor-supporting shelf 48. The other hole 304 in the frame structure of the cutting table 20 is provided in the upright angle iron strut 40 extending from the top of one of the table legs 52 upwardly to the rectangular frame of such table, as best shown in Figures 2 and 4.

Figure 2:
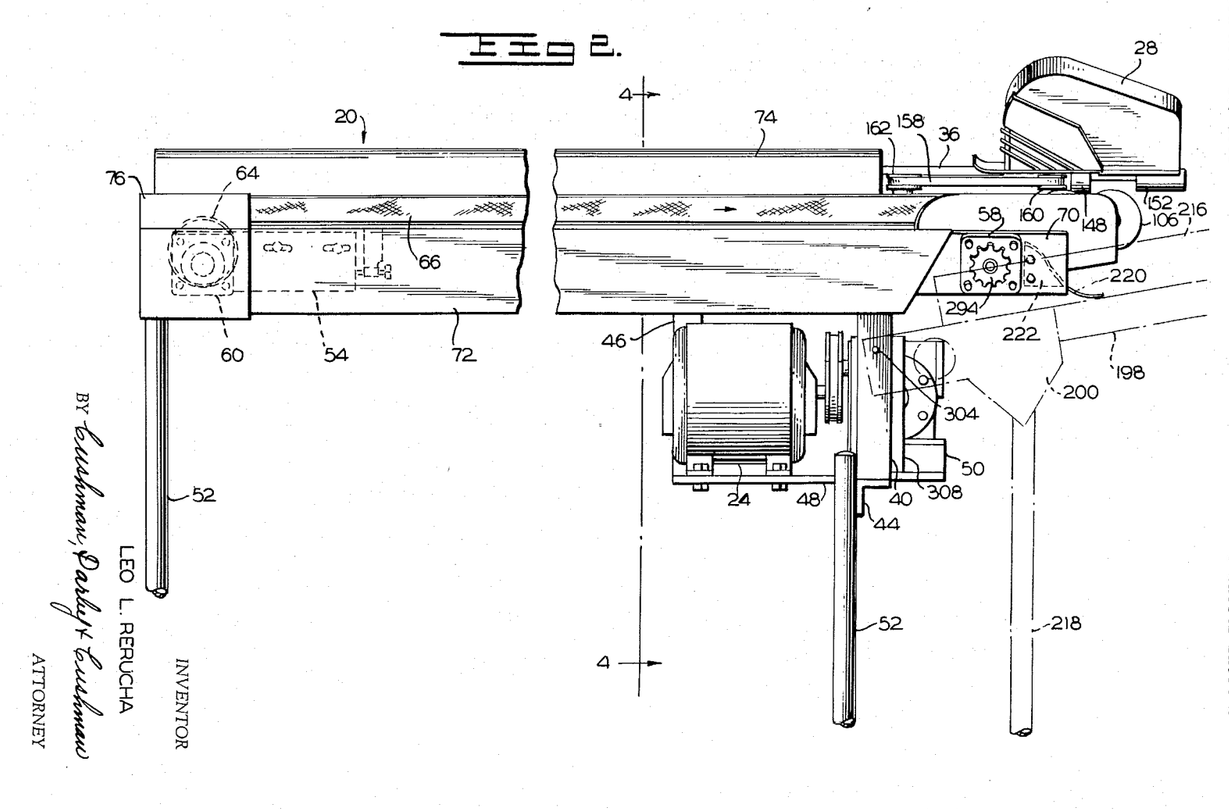
Figure 2 is a fragmentary elevational view of the right-hand portion of the machine shown in Figure 1, and taken from the opposite side of the showing of the latter figure.

As previously stated and as best shown in Figures 1 and 2, the cut-off mechanism of the machine together with the drive therefor is provided with guard covers 28 and 30 to protect the operators of the machine against possible injury. For the same reason, the floating frame 254 on the trimming table 22, together with the endless belts 270, the trimming disc 230, and circular saw 298, are provided with a guard cover 310. The cover 310 may be hinged at one end, as at 312, to the side walls 216, as best shown in Figure 3, for pivotal movement about a substantially horizontal axis to enable such cover to be lifted to expose the mechanism concealed and guarded thereby.

It will thus be seen that the objects of this invention have been fully and effectively accomplished. It will be realized, however, that various changes may be made in the specific embodiment of the invention that has been disclosed for illustrative purposes, without departing from the principles of the invention. Therefore, this invention embraces all modifications which come within the spirit and scope of the following claims.

I claim:

1. A machine for cutting the elbow portions from U-shaped pieces of macaroni draped on a macaroni stick comprising: means defining a pair of opposed cutting edges spaced vertically apart a distance slightly greater than the width of the stick; conveyor means for supporting and advancing the macaroni pieces and the stick between said cutting edges with the stick advancing endwise and disposed longitudinally of said edges and the straight portions of the macaroni pieces advancing sideways and in a substantially horizontal position, so that they are disposed substantially at right angles to a plane including said edges; additional conveyor means disposed to the rear of said cutting edges for gripping and pulling the stick between the bite thereof at substantially the same linear speed as said first mentioned conevyor means; and tubular guide means for the stick disposed between said cutting edges and said additional conveyor means.

2. A machine for cutting the elbow portions from U-shaped pieces of macaroni draped on a macaroni stick comprising: means defining a pair of superposed cutting edges spaced apart a distance slightly greater than the width of the stick; wide endless conveyor means for advancing the macaroni and the stick between said cutting edges, with the straight portions of the macaroni being supported on said conveyor means in a substantially horizontal position and at right angles to the direction of movement thereof; and substantially vertical abutment means in advance of said cutting edges, offset slightly laterally therefrom and extending in the direction of conveyor movement, for engagement of the elbow portions thereagainst to hold such portions against the stick.

3. A machine for cutting the elbow portions from U-shaped pieces of macaroni draped on a macaroni stick comprising: means defining a pair of superposed cutting edges spaced apart a distance slightly greater than the width of the stick; wide endless conveyor means for advancing the macaroni and the stick between said cutting edges, with the straight portions of the macaroni being supported on said conveyor means in a substantially horizontal position and at right angles to the direction of movement thereof; substantially vertical movement abutment means in advance of said cutting edges, offset slightly laterally therefrom and extending in the direction of conveyor movement, for engagement of the elbow portions thereagainst to hold such portions against the stick; and means for moving said abutment means in the direction of conveyor movement and at substantially the same linear speed.

4. A machine for cutting the elbow portions from U-shaped pieces of macaroni draped on a macaroni stick comprising: a pair of superposed rotatable cutting discs mounted with their edges in opposition and spaced apart a distance slightly greater than the width of the stick; a substantially horizontal endless belt conveyor, offset laterally from the plane of said discs and terminating thereadjacent, for supporting the macaroni crosswise thereon with the stick aligned with the bite of said discs and for advancing the macaroni and the stick between said discs to cut off the elbow portions; a pair of circumferentially grooved opposed wheels mounted to the rear of said discs and in their plane for receiving and gripping the stick therebetween; and means for driving said wheels in opposite directions at substantially the same linear speed as said conveyor to pull the stick between the bite of said discs, said wheels being provided with narrow circumferential recesses, at the bottom of the stick gripping grooves, receiving peripheral portions of said discs therein, whereby the bite of said wheels is closely adjacent the bite of said discs.

5. A machine for cutting the elbow portions from U-shaped pieces of macaroni draped on a macaroni stick comprising: a pair of superposed rotatable cutting discs mounted with their edges in opposition and spaced apart a distance slightly greater than the width of the stick; a substantially horizontal endless belt conveyor, offset laterally from the plane of said discs and terminating thereadjacent, for supporting the macaroni crosswise thereon with the stick aligned with the bite of said discs and for advancing the macaroni and the stick between said discs to cut off the elbow portions; and tubular means located to the rear of said cutting discs for guiding the stick in its passage therebetween.

6. A machine for cutting the elbow portions from U-shaped pieces of macaroni draped on a macaroni stick comprising: a pair of superposed rotatable cutting discs mounted with their edges in opposition and spaced apart a distance slightly greater than the width of the stick; a substantially horizontal endless belt conveyor, offset laterally from the plane of said discs and terminating thereadjacent, for supporting the macaroni crosswise thereon with the stick aligned with the bite of said discs and for advancing the macaroni and the stick between said discs to cut off the elbow portions; a pair of circumferentially grooved opposed wheels mounted to the rear of said discs for receiving and gripping the stick therebetween; means for driving said wheels in opposite directions at substantially the same linear speed as said conveyor to pull the stick between the bite of said discs; and tubular means located between the bite of said wheels and the bite of said discs for guiding the stick in its passage between said discs and between said wheels.

7. The structure defined in claim 6 including additional tubular guide means for the stick located to the rear of the wheels.

8. A machine for cutting the elbow portions from U-shaped pieces of macaroni draped on a macaroni stick comprising: a pair of superposed rotatable cutting discs mounted with their edges in opposition and spaced apart a distance slightly greater than the width of the stick; a substantially horizontal endless belt conveyor, offset laterally from the plane of said discs and terminating thereadjacent, for supporting the macaroni crosswise thereon with the stick aligned with the bite of said discs and for advancing the macaroni and the stick between said discs to cut off the elbow portions; an endless belt supported on a pair of spaced rollers mounted for rotation on vertical axes, one flight of said belt extending in spaced relation along an edge of the terminal portion of said conveyor and being offset laterally from the plane of said discs on the opposite side thereof from said conveyor; and means for driving said belt at substantially the same linear speed as said conveyor, whereby the elbow portions of the macaroni pieces are pressed against the stick during advance into the bite of said discs.

9. A machine for cutting the elbow portions from U-shaped pieces of macaroni draped on a macaroni stick and severing the straight portions of such pieces into shorter lengths comprising: means defining a pair of superposed cutting edges spaced apart a distance slightly greater than the width of the stick; conveyor means for advancing the macaroni pieces substantially horizontally and sideways, and the stick endwise, between said cutting edges to sever the elbow portions, said conveyor means terminating adjacent said edges; additional conveyor means, having at least a portion thereof disposed below the terminal portion of said first mentioned conveyor means for receiving, by gravity, the straight portions of the macaroni pieces after severance of the elbows therefrom and advancing the straight portions sideways in a substantially horizontal position; and a rotatable cutting disc in the path of movement of the advancing straight portions for severing the same between their ends.

10. The structure defined in claim 9 in which the cutting edges are offset laterally from both of the conveyor means, and both of the latter are laterally declined away from said cutting edges.

11. The structure defined in claim 9 including a table mounting a first mentioned conveyor means and the cutting edges with the terminal end of said conveyor means disposed adjacent an end of said table; and a second table detachably secured to said first mentioned table and mounting the additional conveyor means and the rotatable cutting disc, the detachability of said tables permitting the substitution for said second table of other tables mounting more than one cutting disc in parallel relation and at diverse spacings transversely of said additional conveyor means.

12. The structure defined in claim 9 including a table mounting the first mentioned conveyor means and the cutting edges with the terminal end of said conveyor means disposed adjacent an end of said table; and a second table detachably secured to said first mentioned table and mounting the additional conveyor means and the rotatable cutting disc; and detachable means for driving said additional conveyor means and said cutting disc from said first mentioned conveyor means.

13. The structure defined in claim 9 including a table mounting the first mentioned conveyor means and the cutting edges with the terminal end of said conveyor means disposed adjacent an end of said table; and a second table detachably secured to said first mentioned table and mounting the additional conveyor means and the rotatable cutting disc, and a chute for transferring the straight portions of the macaroni pieces from said first mentioned conveyor means to said additional conveyor means.

14. A machine for cutting the elbow portions from U-shaped pieces of macaroni draped on a macaroni stick and severing the straight portions of such pieces into shorter lengths comprising: means defining a pair of superposed cutting edges spaced apart a distance slightly greater than the width of the stick; conveyor means for advancing the macaroni pieces substantially horizontally and sideways, and the stick endwise, between said cutting edges to sever the elbow portions, said conveyor means terminating adjacent said edges; additional conveyor means, having at least a portion thereof disposed below the terminal portion of said first mentioned conveyor means for receiving, by gravity, the straight portions of the macaroni pieces after severance of the elbows therefrom and advancing the straight portions sideways in a substantially horizontal position; a rotatable cutting disc in the path of movement of the advancing straight portions for severing the same between their ends; and movable hold-down means for engaging the advancing straight portions and holding them against said additional conveyor means during severance by said cutting disc.

15. The structure defined in claim 14 including means for driving the hold-down means at the same linear speed as the additional conveyor means.

16. In a machine for trimming straight pieces of macaroni of non-uniform length into pieces of uniform length, the combination comprising: an endless conveyor means having a flight thereof disposed in a substantially horizontal plane for advancing the non-uniform length pieces of macaroni sideways thereon; a substantially vertical wall extending parallel and adjacent to one edge of said flight for abutting one end of said macaroni pieces thereagainst; an anvil having a straight edge disposed parallel to, spaced laterally from, and facing away from the other edge of said flight, and a rotatable cutting disc mounted on a horizontal shaft disposed transversely of and above said flight with the edge of said disc cooperatively overlapping said straight anvil edge, said disc having a plurality of edge notches each having a sharp arcuate edge portion facing in the direction of rotation of said disc.

17. The structure defined in claim 16 in which the conveyor means comprises a plurality of laterally spaced belts and including at least one horizontal plate mounted between two of said belts on a level therewith and beneath the horizontal shaft; and at least one additional cutting disc mounted on said shaft with its cutting edge depending into close proximity with said plate for severing the trimmed pieces of macaroni into shorter sections.

18. In a machine for cutting straight pieces of macaroni into shorter sections, the combination comprising: endless conveyor means having a flight thereof disposed in a substantially horizontal plane for advancing the macaroni pieces sideways thereon; at least one cutting means comprising an anvil and a cutting disc mounted in the path of movement of the advancing macaroni pieces for transversely severing the same; a frame mounted for free vertical movement above the flight of the conveyor means; a pair of spaced parallel shafts rotatably carried by said frame transversely of said flight; at least one endless belt carried by said shafts and having the lower flight thereof adapted for overlying yieldable engagement with the advancing macaroni pieces; and resilient means suspending one end of said frame over said flight of said conveyor means; and link means pivotally connecting said frame end to fixed portions of the machine on opposite sides of said flight.

19. A machine for cutting the elbow portions from U-shaped pieces of macaroni disposed about a macaroni stick, said machine comprising: a frame; two spaced-apart cutters arranged one above the other with oppositely-disposed cutting edges, said cutters each being rotatably secured to said frame and each having a circular cutting edge, said cutters being spaced apart approximately the width of said stick; a belt system rotatably mounted on said frame, said belt system including a traveling belt having a portion moving toward said cutters and engaged with a side of said stick; a conveyor for supporting the straight portions of said pieces during cutting, said conveyor moving in a corresponding parallel direction to said stick; a second conveyor disposed on the other side of said cutters from said first conveyor and having an upper portion moving away from said first conveyor, said second conveyor being disposed spaced from said first conveyor; a guide pan secured to said frame and disposed between said conveyors for delivering macaroni therebetween; and at least one belt system including a belt having a notched undersurface, said belt having a portion disposed opposite and in parallelism with the upper side of said second conveyor and also moving away from said first conveyor.

20. A machine for cutting the elbow portions from U-shaped pieces of macaroni disposed about a macaroni stick, said machine comprising: a frame; two spaced-apart cutters arranged one above the other with oppositely disposed cutting edges, said cutters being spaced apart approximately the width of said stick; means for moving said stick endwise between said cutters; a conveyor for supporting the straight portions of said pieces during cutting, said conveyor moving in a corresponding parallel direction to said stick; a second conveyor disposed on the other side of said cutters from said first conveyor and having an upper portion moving away from said first conveyor, said second conveyor being disposed spaced from said first conveyor; a guide pan secured to said frame and disposed between said conveyors for delivering macaroni therebetween; and at least one belt system including at least one belt having a notched undersurface, said belt having a portion disposed opposite and in parallelism with the upper side of said second conveyor and also moving away from said first conveyor.

21. A machine for cutting the elbow portions from U-shaped pieces of macaroni disposed about a macaroni stick, said machine comprising: two spaced-apart cutters arranged one above the other with oppositely-disposed cutting edges, said cutters being spaced apart approximately the width of said stick; means for moving said stick endwise between said cutters; a stick guide pipe disposed on the other side of said cutters from said moving means and disposed for guiding said stick endwise between said cutters; and means for supporting the straight portions of said pieces and for causing said straight portions to move simultaneously with said stick and in a corresponding parallel direction.

References Cited in the file of this patent

UNITED STATES PATENTS

| | | |
|---|---|---|
| 73,299 | Collins et al. | Jan. 14, 1868 |
| 1,029,059 | Gammel | June 11, 1912 |
| 1,098,398 | Phinney | June 2, 1914 |
| 1,134,530 | Hauber | Apr. 6, 1915 |
| 1,242,542 | Gammel | Oct. 9, 1917 |
| 1,256,023 | Killingsworth | Feb. 12, 1918 |
| 1,580,008 | Buchanan | Apr. 6, 1926 |
| 2,593,543 | Curioni | Apr. 22, 1952 |